US012184067B2

(12) United States Patent
Peng et al.

(10) Patent No.: US 12,184,067 B2
(45) Date of Patent: Dec. 31, 2024

(54) COMMUNICATION POWER SUPPLY SYSTEM

(71) Applicant: Huawei Digital Power Technologies Co., Ltd., Shenzhen (CN)

(72) Inventors: Jianhua Peng, Shenzhen (CN); Haibo Long, Dongguan (CN); Zehua Liang, Dongguan (CN); Wanxiang Ye, Dongguan (CN); Wei Guo, Dongguan (CN); Yanxing Yang, Dongguan (CN); Fugao Zhao, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 277 days.

(21) Appl. No.: 17/707,451

(22) Filed: Mar. 29, 2022

(65) Prior Publication Data

US 2022/0224152 A1    Jul. 14, 2022

Related U.S. Application Data

(63) Continuation of application No. PCT/CN2020/123899, filed on Oct. 27, 2020.

(30) Foreign Application Priority Data

Oct. 31, 2019  (CN) .......................... 201911054148.2

(51) Int. Cl.
*H02J 13/00*  (2006.01)
*H02J 9/06*   (2006.01)

(52) U.S. Cl.
CPC ........ *H02J 13/00002* (2020.01); *H02J 9/061* (2013.01); *H02J 13/0004* (2020.01)

(58) Field of Classification Search
CPC ................. H02J 13/00; H02J 13/00002; H02J 13/00032; H02J 13/00036; H02J 13/0004;
(Continued)

(56) References Cited

U.S. PATENT DOCUMENTS 5,990,577 A *  11/1999  Kamioka ................ H02J 9/061
                                                      307/26
9,979,227 B2 *  5/2018  Li ......................... H02J 7/0068
(Continued)

FOREIGN PATENT DOCUMENTS

CN       1921260 A    2/2007
CN     102684303 A    9/2012
(Continued)

*Primary Examiner* — Jeffrey A Gblende
(74) *Attorney, Agent, or Firm* — Rimon PC (57) ABSTRACT

A communication power supply system includes an alternating current power distribution module, a rectifier module, a monitoring module, a direct current power distribution module, and a signal-driven collection board. The monitoring module sends a control signal to the direct current power distribution module by using the signal-driven collection board, where the control signal is used to control the closing or opening of a circuit in the direct current power distribution module. The communication power supply system uses the monitoring module to control the direct current power distribution module, to control whether to power on the loads connected to the direct current power distribution module.

8 Claims, 6 Drawing Sheets

(58) Field of Classification Search
CPC ...... H02J 9/061; H02J 9/06; H02J 9/04; H02J 9/00
See application file for complete search history.

(56) References Cited

U.S. PATENT DOCUMENTS

| | | | |
|---|---|---|---|
| 11,128,214 B2* | 9/2021 | Mahendra | ............... H03M 1/66 |
| 11,967,857 B1* | 4/2024 | Cooper | .................... H02J 9/00 |
| 2009/0121544 A1 | 5/2009 | Bailey | |

FOREIGN PATENT DOCUMENTS

| | | |
|---|---|---|
| CN | 102801208 A | 11/2012 |
| CN | 102815229 A | 12/2012 |
| CN | 204231010 U | 3/2015 |
| CN | 204334124 U | 5/2015 |
| CN | 204425022 U | 6/2015 |
| CN | 204578205 U | 8/2015 |
| CN | 107453590 A | 12/2017 |
| CN | 208127982 U | 11/2018 |
| CN | 209526557 U | 10/2019 |
| WO | 2011039601 A1 | 4/2011 |

* cited by examiner

COMMUNICATION POWER SUPPLY SYSTEM

CROSS-REFERENCE TO RELATED APPLICATIONS

This application is a continuation of International Application No. PCT/CN2020/123899, filed on Oct. 27, 2020, which claims priority to Chinese Patent Application No. 201911054148.2, filed on Oct. 31, 2019. The disclosures of the aforementioned applications are hereby incorporated by reference in their entireties.

TECHNICAL FIELD

This application relates to the field of electronic circuit technologies, and in particular, to a communication power supply system.

BACKGROUND

A communication power supply system is widely used in the communication field, and is configured to provide a direct current power supply for a communication system device. A communication power supply system generally includes the following modules: an alternating current power distribution module, a rectifier module, and a direct current power distribution module. In a communication power supply system, the current from the alternating current power distribution module is converted into a direct current by using the rectifier module, and the direct current is supplied to each load by using the direct current power distribution module.

In a conventional technology, the direct current power distribution module includes contactors and shunts corresponding to different loads, to supply power to the different loads. Generally, loads that need to be always powered on are called primary loads, and the primary loads are generally directly connected to the rectifier module. Loads that do not need to be always powered on are called secondary loads, and these secondary loads are generally loads generated by a humidifier, an air conditioner, a lighting system, and the like. The secondary loads are connected to the rectifier module by using the contactors and the shunts in the direct current power distribution module. The contactors control whether to power on these secondary loads.

To control whether to power on the secondary loads, corresponding contactors and shunts need to be configured for these secondary loads. Therefore, when the number of the secondary loads in the communication power supply system increases, the number of the contactors and the shunts in the direct current power distribution module need to be increased accordingly, causing the volume and the costs of the communication power supply system to keep increasing.

SUMMARY

Embodiments of this application provide a communication power supply system. The communication power supply system uses a monitoring module to control a direct current power distribution module, to control whether to power on the loads connected to the direct current power distribution module. In this way, configuration of a contactor and a shunt in the communication power supply system is no longer needed, thereby effectively reducing the volume of the communication power supply system and reducing the costs of the communication power supply system.

A first aspect of an embodiment of this application provides a communication power supply system. The communication power supply system includes an alternating current power distribution module, a rectifier module, a monitoring module, a direct current power distribution module, and a signal-driven collection board. The alternating current power distribution module is configured to receive an alternating current (or a high-voltage direct current) input from outside, and provide a main power supply for the rectifier module, the monitoring module, the signal-driven collection board, and the direct current power distribution module. The rectifier module is connected to the alternating current power distribution module. After receiving an alternating current (or a high-voltage direct current) output by the alternating current power distribution module, the rectifier module rectifies the alternating current (or the high-voltage direct current) and outputs a direct current. The signal-driven collection board includes at least one access port, the signal-driven collection board is connected to the direct current power distribution module by using the at least one access port, and the monitoring module configures a load type for the at least one access port, so that the direct current power distribution module connected to the at least one access port is connected to a load based on the load type. The monitoring module is connected to the direct current power distribution module by using a communication bus and the signal-driven collection board. The monitoring module sends a control signal to the direct current power distribution module by using the signal-driven collection board, where the control signal is used to control the closing or opening of a circuit in the direct current power distribution module. The direct current power distribution module is connected to the rectifier module, and the direct current power distribution module is configured to provide a direct current for the load connected to the direct current power distribution module. The signal-driven collection board is configured to transmit a current detection signal to the monitoring module, where the current detection signal is collected by the direct current power distribution module, and the current detection signal is used to indicate information about a load currently connected to the direct current power distribution module.

In some embodiments of this application, the communication power supply system uses the monitoring module to control the direct current power distribution module, to control whether to power on the loads connected to the direct current power distribution module. In this way, configuration of a contactor and a shunt in the communication power supply system is spared, thereby effectively reducing the volume of the communication power supply system and reducing the costs of the communication power supply system. The signal-driven collection board includes the at least one access port, and each access port is connected to one direct current power distribution module. Because the monitoring module is connected to the direct current power distribution module by using the signal-driven collection board, the monitoring module may configure a load type for the access port, and a user connects, based on the load type configured for each access port, a load to the direct current power distribution module connected to each access port. For example, when a load type configured by the monitoring module for a first access port is a battery, the user connects a battery to a first direct current power distribution module connected to the first access port. The communication power supply system may configure the load type for the access port on the signal-driven collection board, and the user connects, based on the load type, a load to a corresponding direct current power distribution module connected to the access port, to implement custom load configuration. In addition, because the load type is preconfigured in the communication power supply system, it is convenient for the communication power supply system to manage each load.

In a possible design of the first aspect, the direct current power distribution module is connected to the monitoring module by using a plug-in connection to the signal-driven collection board, and the direct current power distribution module is connected to the rectifier module by using a plug-in connection to a power busbar.

In some embodiments of this application, the direct current power distribution module may be connected to other modules (the signal-driven collection board and the power busbar) in the communication power supply system in a plug-in manner, and the direct current power distribution module supports plug-and-play. Therefore, in the communication power supply system, a load may be expanded at any time, thereby improving the convenience of using this solution.

In a possible design of the first aspect, the monitoring module sends a control signal to the direct current power distribution module by using the signal-driven collection board, to control the closing or opening of the circuit in the direct current power distribution module by controlling a working status of a switch device in the direct current power distribution module. Specifically, when the switch device is opened, the circuit in the direct current power distribution module is opened, and the load connected to the direct current power distribution module is powered off. When the switch device is closed, the circuit in the direct current power distribution module is closed, and the load connected to the direct current power distribution module is powered on.

In some embodiments of this application, the communication power supply system uses the monitoring module to send a control signal to the direct current power distribution module, and the control signal is used to control the working status of the switch device in the direct current power distribution module. In other words, the communication power supply system uses the monitoring module to control the closing or opening of the circuit in the direct current power distribution module. In this way, configuration of a contactor and a shunt in the communication power supply system is no longer needed, thereby effectively reducing the volume of the communication power supply system and reducing the costs of the communication power supply system.

In a possible design of the first aspect, the monitoring module provides a power supply for the switch device in the direct current power distribution module by using the signal-driven collection board.

In a possible design of the first aspect, the monitoring module is connected to the signal-driven collection board by using a power circuit breaker, where the power circuit breaker is connected to the monitoring module in a plug-in manner. The monitoring module provides a power supply for the signal-driven collection board by using the power circuit breaker, so that the signal-driven collection board provides a power supply for the switch device in the direct current power distribution module.

In a possible design of the first aspect, the communication power supply system further includes a battery, and the battery is connected to the direct current power distribution module. The battery provides a backup power supply for the rectifier module by using the power busbar, and the battery provides a backup power supply for the monitoring module by using the signal-driven collection board.

In a possible design of the first aspect, the monitoring module sends, by using the signal-driven collection board, the control signal to the direct current power distribution module connected to the signal-driven collection board, to control a working status of the battery.

In a possible design of the first aspect, the communication power supply system further includes the alternating current power distribution module. The alternating current power distribution module includes at least one first circuit breaker, where the first circuit breaker accesses an alternating current, and the first circuit breaker is connected to the rectifier module. The monitoring module is connected to the alternating current power distribution module, and the monitoring module controls on/off or the closing of the first circuit breaker to control the accessed alternating current.

According to the foregoing technical solutions, it can be learned that the embodiments of this application have the following advantages.

The communication power supply system uses the monitoring module to control the direct current power distribution module, to control whether to power on the loads connected to the direct current power distribution module. In this way, configuration of a contactor and a shunt in the communication power supply system is spared, thereby effectively reducing the volume of the communication power supply system and reducing the costs of the communication power supply system.

DESCRIPTION OF EMBODIMENTS

Embodiments of this application provide a communication power supply system. The communication power supply system uses a monitoring module to control a direct current power distribution module, to control whether to power on the loads connected to the direct current power distribution module. In this way, configuration of a contactor and a shunt in the communication power supply system is no longer needed, thereby effectively reducing the volume of the communication power supply system and reducing the costs of the communication power supply system.

The following describes embodiments of this application with reference to accompanying drawings.

Figure 1:
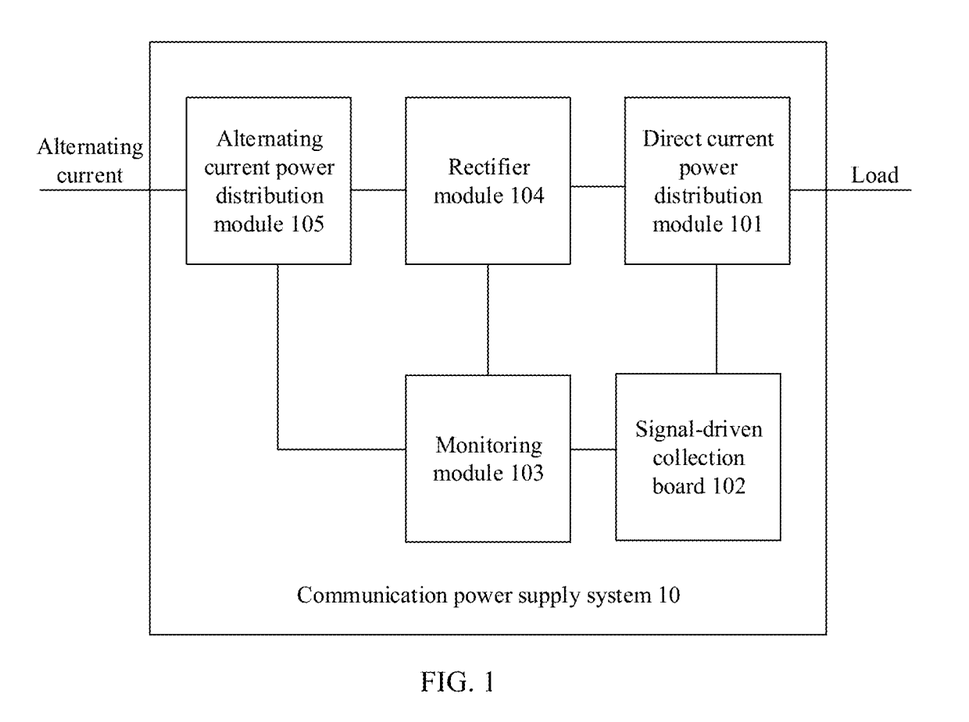
FIG. 1 is a schematic diagram of a structure of a communication power supply system according to an embodiment of this application.

FIG. 1 is a schematic diagram of a structure of a communication power supply system according to an embodiment of this application. As shown in FIG. 1, a communication power supply system 10 includes a direct current power distribution module 101, a signal-driven collection board 102, a monitoring module 103, a rectifier module 104, and an alternating current power distribution module 105. Descriptions are separately provided below.

Alternating current power distribution module 105: The alternating current power distribution module 105 receives an alternating current (or a high-voltage direct current) input from outside, and is configured to provide a main power supply for the rectifier module 104, the monitoring module 103, the signal-driven collection board 102, and the direct current power distribution module 101. In other words, the alternating current power distribution module 105 provides a main power supply for the communication power supply system 10 and a load connected to the direct current power distribution module 101. Optionally, the alternating current power distribution module 105 further includes a lightning arrester (not shown in FIG. 1).

Rectifier module 104: The rectifier module 104 is connected to the alternating current power distribution module 105. Because each module in the communication power supply system 10 generally cannot directly use an alternating current (or a high-voltage direct current), an alternating current (or a high-voltage direct current) output by the alternating current power distribution module 105 needs to be converted by the rectifier module 104 into a low-voltage direct current. The rectifier module 104 outputs the converted direct current to the monitoring module 103, the signal-driven collection board 102 (through forwarding by the monitoring module 103), and the direct current power distribution module 101.

Monitoring module 103: The monitoring module 103 is connected to the alternating current power distribution module 105, the rectifier module 104, and the signal-driven collection board 102, and the monitoring module 103 is connected to the direct current power distribution module 101 by using the signal-driven collection board 102. The monitoring module 103 is configured to detect parameter statuses such as a current and a voltage of each module. For example, the monitoring module 103 is configured to detect a status of the lightning arrester in the alternating current power distribution module 105, and the monitoring module 103 is further configured to detect a status of a circuit breaker in the direct current power distribution module 101. Specifically, the monitoring module 103 may be connected to each module in the communication power supply system 10 by using any one or more of the following types of communication buses: RS485, RS232, CAN, I2C, and/or GPRS.

Direct current power distribution module 101: The direct current power distribution module 101 is connected to the rectifier module 104. The direct current power distribution module 101 is configured to provide a direct current for the load connected to the direct current power distribution module 101, and the direct current is output by the rectifier module 104. The direct current power distribution module 101 is connected to the signal-driven collection board 102, to implement a connection to the monitoring module 103 connected to the signal-driven collection board 102.

Optionally, the direct current power distribution module 101 may be connected to the signal-driven collection board 102 in a plug-in connection manner. The direct current power distribution module 101 may be connected to the rectifier module 104 by using a plug-in connection to a power busbar (busbar). The direct current power distribution module 101 transmits the direct current to the load by using the power busbar. The power busbar is a name of a conducting material on power distribution equipment, is made of copper, and has no insulation layer.

Signal-driven collection board 102: The signal-driven collection board 102 is configured to transmit a control signal of the monitoring module 103 to the direct current power distribution module 101, where the control signal is used to control the closing or opening of a circuit in the direct current power distribution module 101. The signal-driven collection board 102 is configured to transmit a current detection signal to the monitoring module 103, where the current detection signal is collected by the direct current power distribution module 101, and the current detection signal is used to indicate information about a load currently connected to the direct current power distribution module 101.

In some embodiments of this application, the communication power supply system 10 uses the monitoring module 103 to control the direct current power distribution module 101, to control whether to power on the loads connected to the direct current power distribution module 101. In this way, configuration of a contactor and a shunt in the communication power supply system 10 is no longer needed, thereby effectively reducing the volume of the communication power supply system 10 and reducing the costs of the communication power supply system 10.

Figure 2:
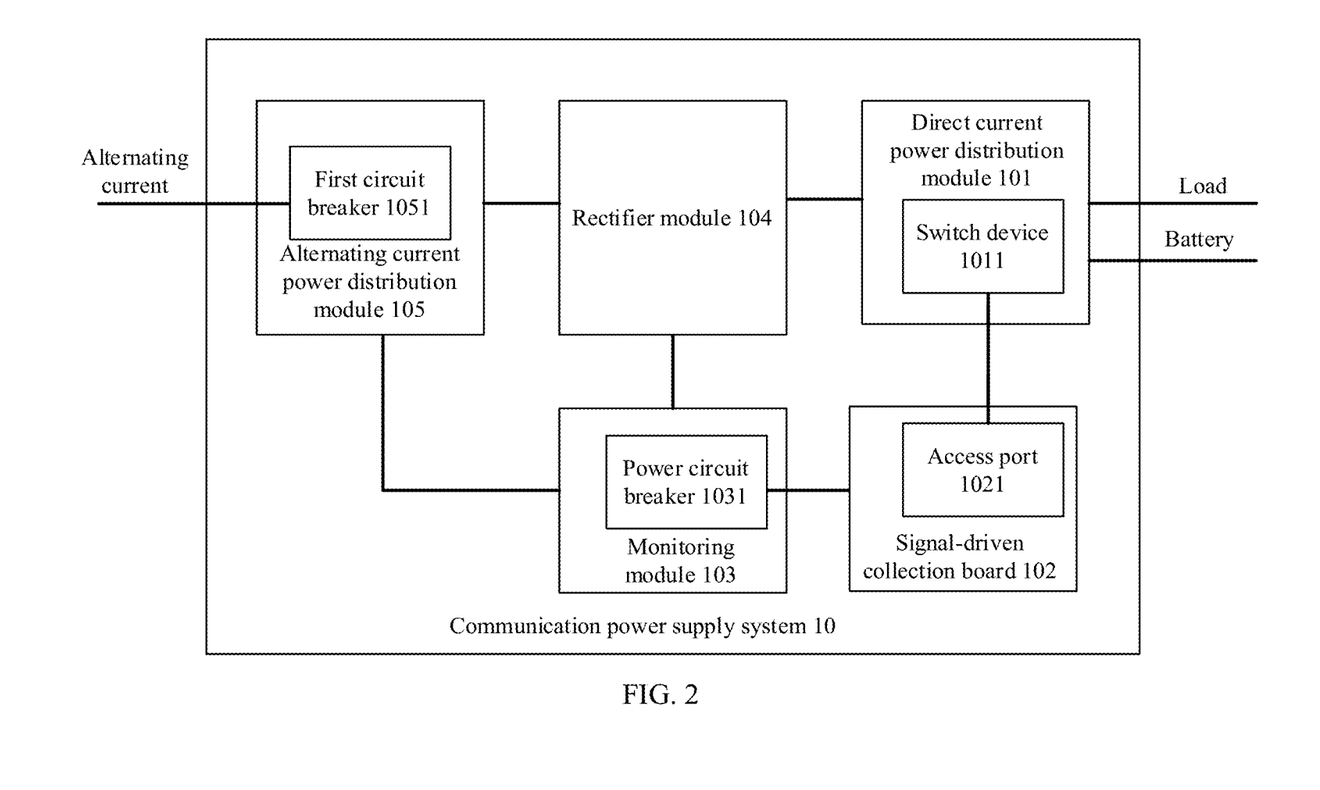
FIG. 2 is a schematic diagram of a structure of another communication power supply system according to an embodiment of this application.

Based on the embodiment corresponding to FIG. 1, FIG. 2 is a schematic diagram of a structure of another communication power supply system according to an embodiment of this application. As shown in FIG. 2, a communication power supply system 10 includes a direct current power distribution module 101, a signal-driven collection board 102, a monitoring module 103, a rectifier module 104, and an alternating current power distribution module 105. The direct current power distribution module 101 includes a switch device 1011, and the signal-driven collection board 102 includes an access port 1021. The monitoring module 103 includes a power circuit breaker 1031, and the alternating current power distribution module 105 includes a first circuit breaker 1051. Descriptions are provided below.

Direct current power distribution module 101: The direct current power distribution module 101 is connected to the monitoring module 103 by using a plug-in connection to the signal-driven collection board 102. Specifically, the switch device 1011 in the direct current power distribution module 101 is connected to the signal-driven collection board 102, and the monitoring module 103 sends a control signal to the switch device 1011 by using the signal-driven collection board 102. The control signal is used to control the closing or opening of a circuit in the direct current power distribution module 101 by controlling a working status of the switch device 1011 in the direct current power distribution module 101. Specifically, when the switch device 1011 is opened, the circuit in the direct current power distribution module 101 is opened, and a load connected to the direct current power distribution module 101 is powered off. When the switch device 1011 is closed, the circuit in the direct current power distribution module 101 is closed, and the load connected to the direct current power distribution module 101 is powered on.

In an optional implementation, the switch device 1011 includes a motor and a circuit breaker, and the control signal from the monitoring module 103 controls the motor in the switch device 1011. The switch device 1011 drives the motor based on the control signal. The motor in the switch device 1011 controls the circuit breaker in the switch device 1011 to be opened, thereby controlling the circuit in the direct current power distribution module 101 to be opened, and powering off the load connected to the direct current power distribution module 101. Alternatively, the motor in the switch device 1011 controls the circuit breaker in the switch device 1011 to be closed, thereby controlling the circuit in the direct current power distribution module 101 to be closed, and powering on the load connected to the direct current power distribution module 101.

Optionally, a power supply of the switch device 1011 in the direct current power distribution module 101 is provided by the monitoring module 103 by using the signal-driven collection board 102, or is provided by the rectifier module 104 by using the signal-driven collection board 102. This is not limited herein.

Signal-driven collection board 102: The signal-driven collection board 102 includes at least one access port 1021. The direct current power distribution module 101 is connected to the signal-driven collection board 102 by using the access port 1021. The monitoring module 103 configures a load type for the access port 1021, and the load type includes a primary load, a secondary load, a battery, or the like. The primary load is a load that requires uninterruptible power supply. The secondary load is a load that does not require uninterruptible power supply, such as a humidification box, an air conditioner, or a light. The battery is configured to provide a backup power supply for the communication power supply system 10. Based on a load type configured for each access port 1021 on the signal-driven collection board 102, a user may connect a load to a direct current power distribution module 101 connected to each access port 1021. For example, when a load type configured for an access port 1021 is a secondary load, the user connects, based on the load type, a secondary load to a direct current power distribution module 101 connected to the access port 1021.

In an optional implementation, the direct current power distribution module 101 may be connected to the signal-driven collection board 102 in a plug-in connection manner.

Monitoring module 103: The monitoring module 103 includes the power circuit breaker 1031. The monitoring module 103 is connected to the signal-driven collection board 102 by using the power circuit breaker 1031, where the power circuit breaker 1031 is connected to the monitoring module 103 in a plug-in manner. The monitoring module 103 provides a power supply for the signal-driven collection board 102 by using the power circuit breaker 1031, so that the signal-driven collection board 102 provides a power supply for the switch device 1011 in the direct current power distribution module 101.

The monitoring module 103 may control an on/off status of the power circuit breaker 1031, to control whether the signal-driven collection board 102 works. The power circuit breaker 1031 is configured to protect a circuit of the communication power supply system 10, for example, to be automatically opened when an exception (overload) occurs.

In an optional implementation, the direct current power distribution module 101 is connected to a battery, and the battery is configured to provide a backup power supply for the communication power supply system 10. When the alternating current power distribution module 105 outputs no current, the monitoring module 103 delivers an instruction to the direct current power distribution module 101 by using the signal-driven collection board 102. The direct current power distribution module 101 uses, based on the instruction, the battery connected to the direct current power distribution module 101 as the backup power supply, to provide a power supply for each module of the communication power supply system 10.

Alternating current power distribution module 105: The alternating current power distribution module 105 includes at least one first circuit breaker 1051, where the first circuit breaker 1051 accesses an alternating current, and the first circuit breaker 1051 is connected to the rectifier module 104. The monitoring module 103 is connected to the alternating current power distribution module 105, and the monitoring module 103 controls on/off or the closing of the first circuit breaker 1051 to control the accessed alternating current.

When the alternating current input into the alternating current power distribution module 105 comprises two alternating current inputs, in an optional implementation, the alternating current power distribution module 105 may implement an interlock function by using a mechanical interlock apparatus or automatic transfer switching equipment (automatic transfer switching equipment, ATSE). In another optional implementation, the alternating current power distribution module 105 may access alternating currents by respectively using two first circuit breakers 1051, and implement an interlock function under control of the monitoring module 103.

In an optional implementation, a high-voltage direct current (HVDC) may also be input into the alternating current power distribution module 105. In this case, a voltage of the input high-voltage direct current is reduced to a standard voltage value in the communication power supply system 10 after processing by the alternating current power distribution module 105 and the rectifier module 104.

In some embodiments of this application, the monitoring module 103 in the communication power supply system 10 may preconfigure load information for the access port 1021, and the access port 1021 is located on the signal-driven collection board 102. The user may connect a direct current power distribution module 101 to a corresponding access port 1021 based on the load information, and connect a load to a corresponding direct current power distribution module 101. The monitoring module 103 controls the direct current power distribution module 101 based on the load information, thereby improving flexibility of using the communication power supply system 10.

Figure 3:
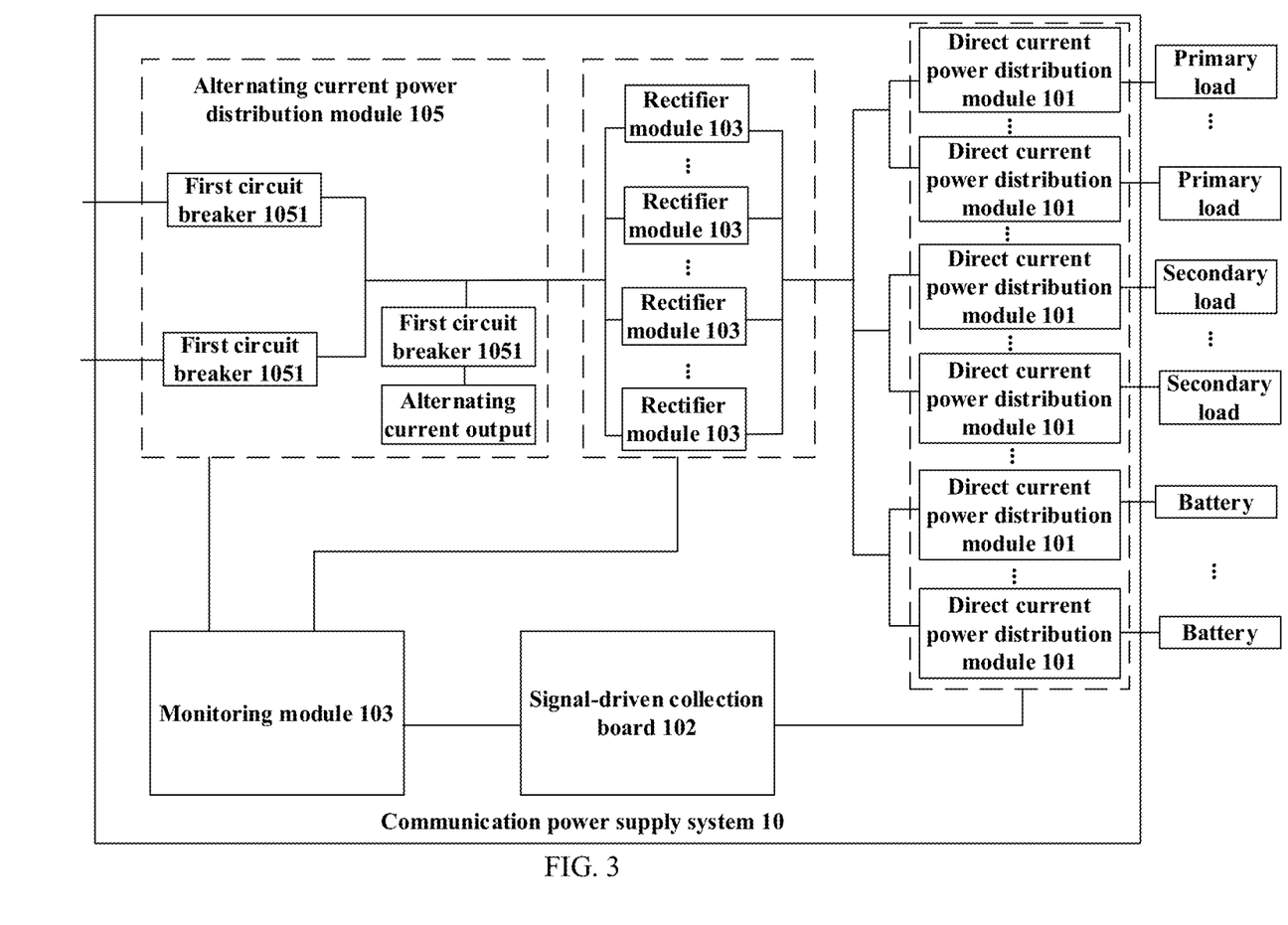
FIG. 3 is a schematic diagram of a structure of another communication power supply system according to an embodiment of this application.

Based on the embodiments of FIG. 1 and FIG. 2, FIG. 3 is a schematic diagram of a structure of another communication power supply system according to an embodiment of this application. As illustrated in FIG. 3, when the alternating current input into the alternating current power distribution module 105 comprises two alternating current inputs, the communication power supply system 10 uses two first circuit breakers 1051 to access one alternating current input each. An interlock function is implemented under control of the monitoring module 103 connected to the alternating current power distribution module 105. In addition to the two first circuit breakers 1051 that access the alternating current inputs, the alternating current power distribution module 105 further includes one first circuit breaker 1051, and the first circuit breaker 1051 outputs an input alternating current to a load using an alternating current ("alternating current output"). Specifically, "alternating current output"

may be an alternating current air conditioner, or the like. The alternating current power distribution module 105 further includes a surge protective device (SPD) (not shown in the figure), which is configured to prevent damage to the communication power supply system 10 by a lightning strike. The alternating current power distribution module 105 and the rectifier module 104 are connected by using a power busbar. An alternating current output by the alternating current power distribution module 105 is rectified by a plurality of rectifier modules 104, and is output in a form of a low-voltage direct current. The rectifier module 104 and the direct current power distribution module 101 are connected by using a power busbar, and the rectifier module 104 transmits a direct current to the direct current power distribution module 101 by using the power busbar. The communication power supply system 10 may include a plurality of direct current power distribution modules 101, and each direct current power distribution module 101 may be connected to a plurality of different loads, such as a primary load, a secondary load, and a battery.

Figure 4:
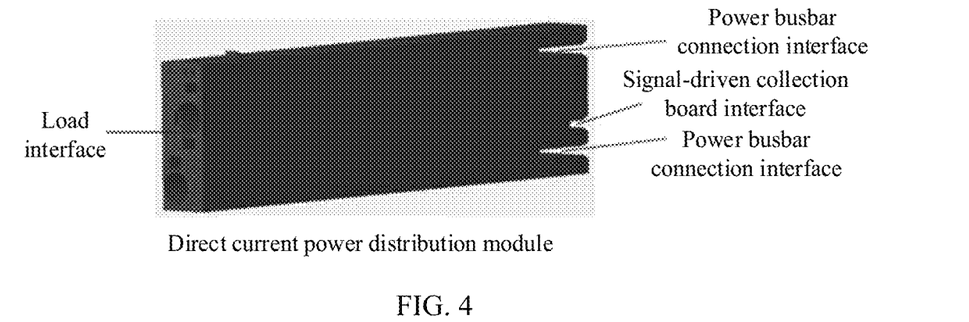
FIG. 4 is a schematic diagram of an appearance of a direct current power distribution module according to an embodiment of this application.

The following describes a direct current power distribution module. FIG. 4 is a schematic diagram of an appearance of a direct current power distribution module according to an embodiment of this application. The direct current power distribution module includes a load interface connected to a load, a power busbar connection interface connected to a power busbar, and a signal-driven collection board interface connected to a signal-driven collection board.

Figure 5:
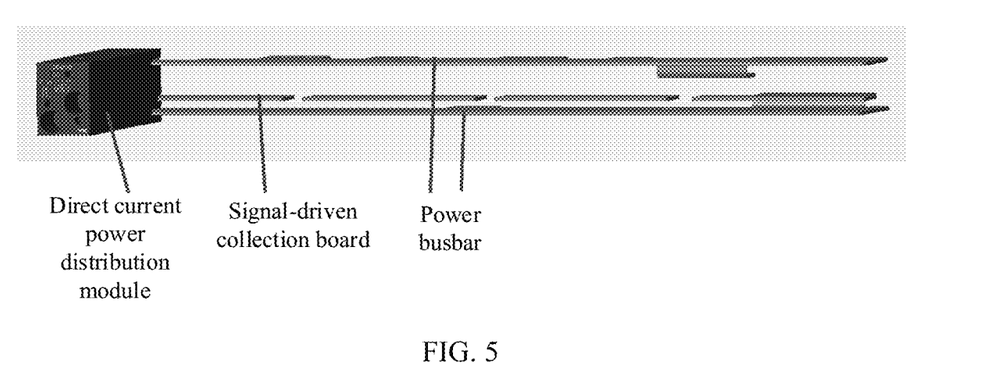
FIG. 5 is a schematic diagram of a connection of a direct current power distribution module according to an embodiment of this application.

Specifically, a connection manner between the direct current power distribution module and the power busbar, and a connection manner between the direct current power distribution module and the signal-driven collection board are shown in FIG. 5. FIG. 5 is a schematic diagram of a connection of a direct current power distribution module according to an embodiment of this application. The power busbar connection interface shown in FIG. 4 is connected to a power busbar, and the signal-driven collection board interface is connected to a signal-driven collection board. The connections may be plug-in connections. In FIG. 5, the signal-driven collection board has a plurality of segments, and each segment corresponds to one access port on the signal-driven collection board.

Figure 6A:
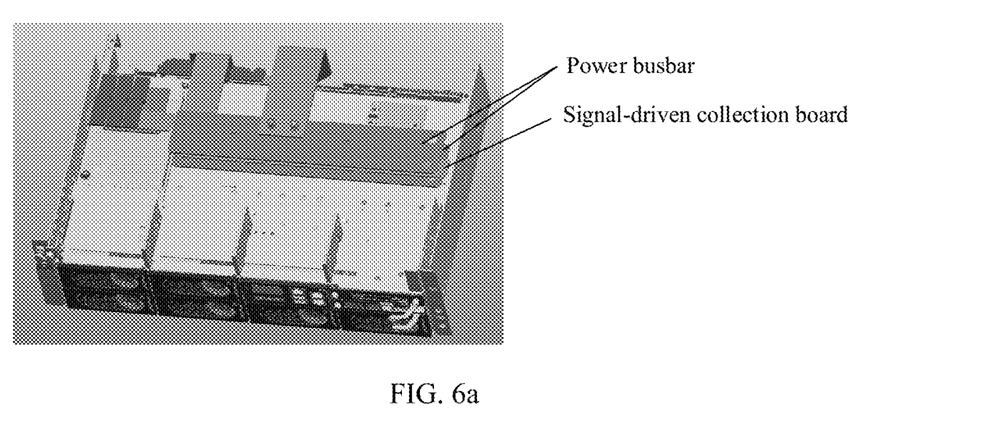
FIG. 6a is a schematic diagram of an appearance of a communication power supply system according to an embodiment of this application.
Figure 6B:
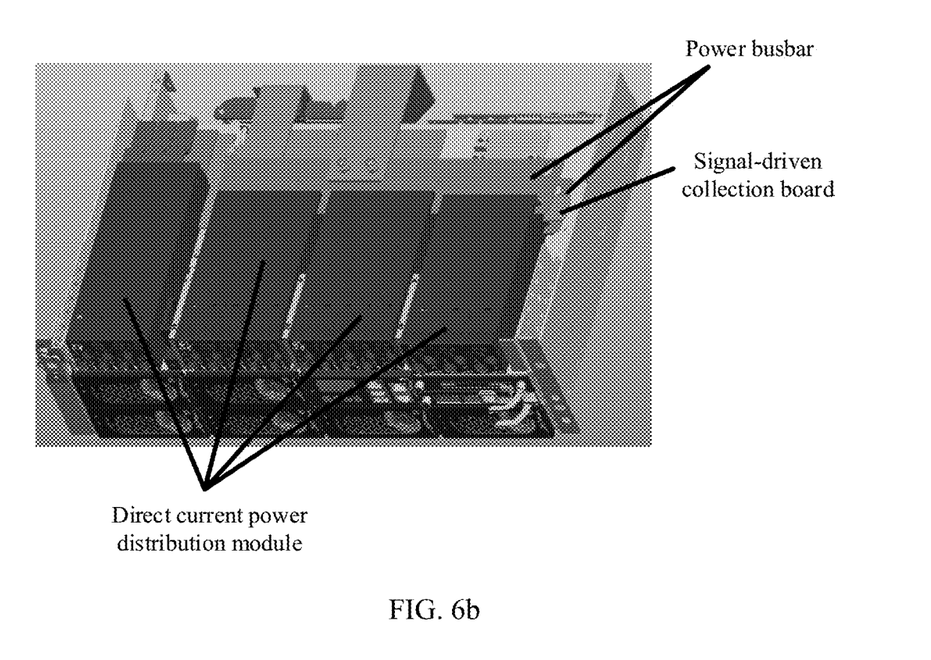
FIG. 6b is a schematic diagram of an appearance of another communication power supply system according to an embodiment of this application.

In an optional implementation, a communication power supply system using the direct current power distribution module shown in FIG. 4 (the direct current power distribution module uses the connection manner shown in FIG. 5) is shown in FIG. 6a and FIG. 6b. FIG. 6a is a schematic diagram of an appearance of a communication power supply system according to an embodiment of this application. FIG. 6b is a schematic diagram of an appearance of another communication power supply system according to an embodiment of this application. In the communication power supply system shown in FIG. 6a, a power busbar and a signal-driven collection board are not connected to a direct current power distribution module, and a slot is pre-arranged in the communication power supply system, so that the direct current power distribution module is connected to the power busbar and the signal-driven collection board at a space position limited by the pre-arranged slot. The pre-arranged slot is in a one-to-one correspondence with an access port of the signal-driven collection board. In FIG. 6b, four direct current power distribution modules are inserted into pre-arranged slots based on the communication power supply system shown in FIG. 6a. It should be noted that the pre-arranged slots shown in FIG. 6a/FIG. 6b are merely used as an example for description, and a specific arrangement manner and a quantity of pre-arranged slots are not limited herein. A pre-arranged slot is arranged in the communication power supply system, and the pre-arranged slot is used by a modular direct current power distribution module to be connected to the communication power supply system, thereby improving practicability of the communication power supply system.

Based on the embodiments corresponding to FIG. 1 to FIG. 6a, FIG. 7 is a schematic diagram of an application structure of a communication power supply system according to an embodiment of this application. The following describes each module in the communication power supply system.

Alternating current power distribution module: In some embodiments of this application, the communication power supply system accesses two alternating current inputs by using the alternating current power distribution module. The two alternating current inputs include an alternating current input 1 and an alternating current input 2. The alternating current input 1 is input into the communication power supply system by using a first circuit breaker. The alternating current input 2 is input into the communication power supply system by using another first circuit breaker. The first circuit breaker includes three-phase access, for example, L1, L2, L3, neutral wire (N) access, and ground cable (PE) access in FIG. 7. It should be noted that the first circuit breaker may be in a plurality of access manners, such as dual-live wire access. This is not limited herein. Optionally, the alternating current input 1 is a standby generator input, and the alternating current input 2 is a mains input.

Figure 7:
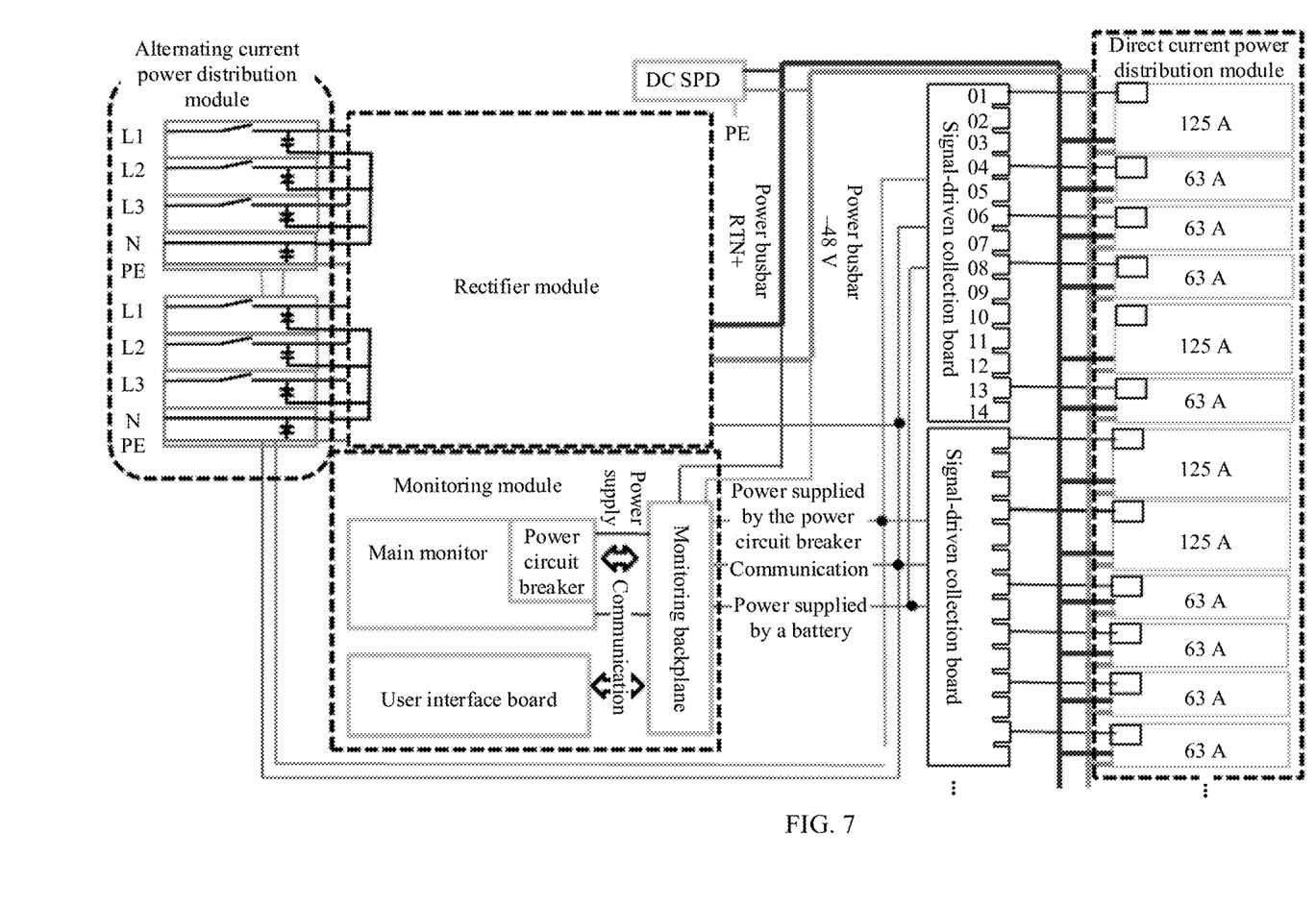
FIG. 7 is a schematic diagram of an application structure of a communication power supply system according to an embodiment of this application.

Rectifier module: The rectifier module rectifies an alternating current output by the alternating current power distribution module, and then outputs a direct current. Specifically, the rectifier module outputs a direct current to a direct current power distribution module by using a power busbar ("Power busbar RTN+" and "Power busbar −48 V"), and outputs a direct current to a monitoring module by using another circuit.

Monitoring module: The monitoring module may be divided into a main monitor, a user interface board, and a monitoring backplane based on a structure. The main monitor may be implemented by using a processing chip such as a central processing unit (CPU), and the main monitor is configured to process various monitoring signals and control signals in the communication power supply system. The user interface board is configured to expand monitoring hardware required by the communication power supply system. The main monitor and the user interface board are connected to another module in the communication power supply system by using the monitoring backplane.

A direct current output by the monitoring backplane is supplied to the main monitor after passing through a power circuit breaker. The monitoring module controls a circuit status (powered on or not) of the communication power supply system by controlling the power circuit breaker.

When the alternating current power distribution module is used as a main power supply, the monitoring module supplies power to a switch device in the direct current power distribution module by using the power circuit breaker and a signal-driven collection board.

Signal-driven collection board: The communication power supply system includes one or more signal-driven collection boards. One end of the signal-driven collection board is connected to the monitoring module, and the monitoring module obtains a current detection signal of the direct current power distribution module by using the signal-driven collection board. The circuit detection signal is used to indicate information about a load currently connected to the direct current power distribution module, or information (for example, a maximum withstand current value) about a current direct current power distribution module. The other end of the signal-driven collection board is one or more access ports, such as "1", "2", . . . , "14" in FIG. 7. Each access port may be connected to the direct current power distribution module. Specifically, the signal-driven collection board is connected to the switch device in the direct current power distribution module by using the access port. The signal-driven collection board forwards a control signal from the monitoring module, to control a circuit status (powered on or off) of each direct current power distribution module.

Direct current power distribution module: As shown in FIG. 7, one or more direct current power distribution modules may be connected in the communication power supply system, and each direct current power distribution module includes a switch device. In FIG. 7, "125 A" and "63 A" indicate current maximum withstand current values of corresponding direct current power distribution modules. There is a load interface on the other end of the direct current power distribution module, and the direct current power distribution module is connected to each load by using the load interface.

The monitoring module may obtain a current value or a voltage value of each direct current power distribution module by using the signal-driven collection board, and identify a port number of an access port that is on the signal-driven collection board and that corresponds to each direct current power distribution module.

In some embodiments of this application, the communication power supply system uses the monitoring module to control the direct current power distribution module, to control whether to power on the loads connected to the direct current power distribution module. In this way, configuration of a contactor and a shunt in the communication power supply system is spared, thereby effectively reducing the volume of the communication power supply system and reducing the costs of the communication power supply system. The monitoring module in the communication power supply system may preconfigure load information for the access port, and the access port is located on the signal-driven collection board. A user may connect a direct current power distribution module to a corresponding access port based on the load information, and connect a load to a corresponding direct current power distribution module. The monitoring module controls the direct current power distribution module based on the load information, thereby improving flexibility of using the communication power supply system. Each module in the communication power supply system may be configured based on an actual requirement, thereby improving practicability of the communication power supply system.

In some embodiments of this application, the communication power supply system may be divided into functional modules based on the foregoing method examples. For example, each functional module may be obtained through division based on each corresponding function, or two or more functions may be integrated into one monitoring module. The integrated module may be implemented in a form of hardware, or may be implemented in a form of a software functional module. It should be noted that in embodiments of this application, division into the modules is an example and is merely logical function division, and may be other division in an actual implementation.

In addition, it should be noted that the apparatus embodiments are merely examples. The modules described as separate parts may or may not be physically separate, and parts displayed as modules may or may not be physical modules, may be located in one position, or may be distributed on a plurality of physical modules. Some or all the modules may be selected based on an actual requirement to achieve the objectives of the solutions of the embodiments. In addition, in the accompanying drawings of the apparatus embodiments provided in this application, connection relationships between modules indicate that the modules have communication connections to each other, which may be specifically implemented as one or more communication buses or signal cables.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

The term "and/or" in this specification describes only an association relationship for describing associated objects and represents that three relationships may exist. For example, A and/or B may represent three cases: There is only A, there are both A and B, and there is only B. In addition, the character "/" in this specification usually indicates an "or" relationship between the associated objects.

It should be understood that in embodiments of this application, "B corresponding to A" indicates that B is associated with A, and B may be determined based on A. However, it should further be understood that determining B based on A does not mean that B is determined based on A only, that is, B may also be determined based on A and/or other information.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In conclusion, the foregoing descriptions are merely example embodiments of the technical solutions in this application, but are not intended to limit the protection scope of this application. Any modification, equivalent replacement, or improvement made without departing from the spirit and principle of this application shall fall in the protection scope of this application.

What is claimed is:

1. A communication power supply system, wherein the communication power supply system comprises an alternating current power distribution module, a rectifier module, a monitoring module, a direct current power distribution module, and a signal-driven collection board;
   the alternating current power distribution module is configured to provide a main power supply for the rectifier module, the monitoring module, the signal-driven collection board, and the direct current power distribution module;
   the rectifier module is connected to the alternating current power distribution module, and the rectifier module is configured to output a direct current;
   the signal-driven collection board comprises at least one access port, the signal-driven collection board is connected to the direct current power distribution module using the at least one access port, and the monitoring module configures a load type for the direct current power distribution module connected to the at least one access port, so that the direct current power distribution module is connected to a load based on the load type;
   the monitoring module is connected to the direct current power distribution module via the signal-driven collection board; and
   the monitoring module sends a control signal to the direct current power distribution module via the signal-driven collection board, wherein the control signal is used to control closing or opening of a circuit in the direct current power distribution module.

2. The communication power supply system according to claim 1, wherein
   the direct current power distribution module is connected to the monitoring module via a plug-in connection to the signal-driven collection board; and
   the direct current power distribution module is connected to the rectifier module via a plug-in connection to a power busbar.

3. The communication power supply system according to claim 2, wherein
   the control signal is used to control the closing or opening of the circuit in the direct current power distribution module by controlling a working status of a switch device in the direct current power distribution module; and
   when the switch device is opened, the circuit in the direct current power distribution module is opened, and the load connected to the direct current power distribution module is powered off; or
   when the switch device is closed, the circuit in the direct current power distribution module is closed, and the load connected to the direct current power distribution module is powered on.

4. The communication power supply system according to claim 3, wherein
   the monitoring module provides a power supply for the switch device in the direct current power distribution module via the signal-driven collection board.

5. The communication power supply system according to claim 4, wherein
   the monitoring module is connected to the signal-driven collection board via a power circuit breaker, wherein the power circuit breaker is connected to the monitoring module in a plug-in manner; and
   the monitoring module provides a power supply for the signal-driven collection board via the power circuit breaker, so that the signal-driven collection board provides a power supply for the switch device in the direct current power distribution module.

6. The communication power supply system according to claim 3, wherein the communication power supply system further comprises a battery;
   the battery is connected to the direct current power distribution module;
   the battery provides a backup power supply for the rectifier module via the power busbar; and
   the battery provides a backup power supply for the monitoring module via the signal-driven collection board.

7. The communication power supply system according to claim 6, wherein
   the monitoring module sends, by using the signal-driven collection board, the control signal to the direct current power distribution module connected to the signal-driven collection board, to control a working status of the battery.

8. The communication power supply system according to claim 1, wherein
   the alternating current power distribution module comprises at least one first circuit breaker, wherein the first circuit breaker accesses an alternating current, and the first circuit breaker is connected to the rectifier module; and
   the monitoring module is connected to the alternating current power distribution module, and the monitoring module controls the opening or closing of the first circuit breaker to control the accessed alternating current.

* * * * *